Oct. 21, 1930.                H. BRANDL ET AL                    1,778,790
                         GASEOUS FUEL MIXING DEVICE
                            Filed Jan. 28, 1928
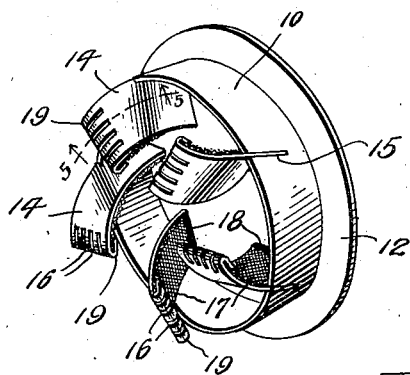
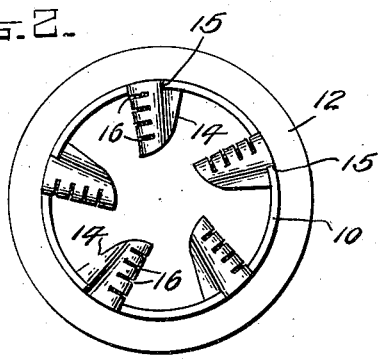
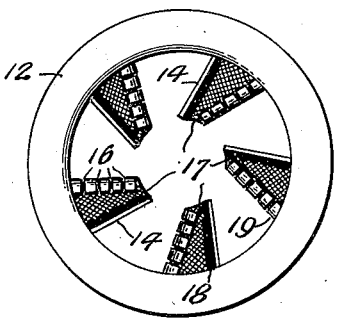
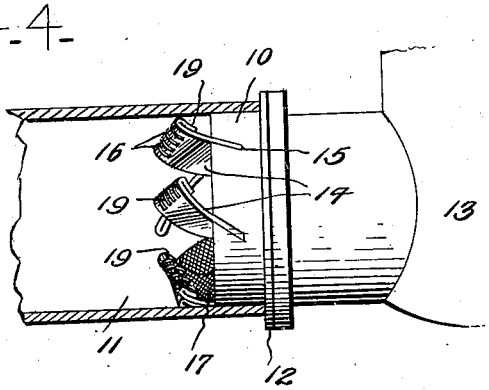
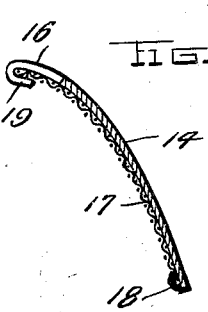
Inventors
Hans Brandl
Arthur Goldberger
Witness Patented Oct. 21, 1930

1,778,790

UNITED STATES PATENT OFFICE

HANS BRANDL AND ARTHUR GOLDBERGER, OF VIENNA, AUSTRIA, ASSIGNORS OF ONE-HALF TO JULIUS HABER AND WOLF ICHILSON, BOTH OF VIENNA, AUSTRIA

GASEOUS-FUEL-MIXING DEVICE

Application filed January 28, 1928, Serial No. 250,263, and in Austria August 30, 1927.

The invention relates to devices for use in the fuel intake passages of internal combustion engines for the purpose of effecting a thorough mixture of sprayed fuel and air.

The object of the invention is to provide a device of the class set forth which is extremely simple and inexpensive, yet efficient and reliable for not only insuring thorough mixing of the fuel and air, but for so whirling the mixture as to prevent it from clinging to the wall of the intake passage.

With the foregoing in view, the invention resides in the novel subject matter hereinafter described and claimed, description being accomplished by reference to the accompanying drawing.

Fig. 1 is a perspective view of a device constructed in accordance with our invention.

Figs. 2 and 3 are side elevations looking in different directions.

Fig. 4 is an edge view showing the device applied to a carbureter and the lower portion of an intake manifold, the latter being in section.

Fig. 5 is an enlarged detail sectional view on line 5—5 of Fig. 1.

In the form of construction selected for illustration in the present application, a ring 10 is provided for reception in the lower end of an intake manifold 11 or in some other part of the fuel intake passage of a motor. In the construction shown, ring 10 is provided with an outstanding flange 12 to be clamped between the manifold 11 and the carbureter 13. Secured to and projecting inwardly from ring 10, are a number of helically pitched vanes 14, one end of each vane being preferably secured in a slot 15 in said ring. The other ends of the vanes preferably project beyond the ring and are longitudinally curved to effect forcible whirling of the air and fuel coming in contact with them. The ends of these vanes disposed toward the delivery end of the manifold or the like 11, are each provided with a plurality of longitudinal slits 16. Finely woven wire webbing 17 covers the sides of the vanes 14 which are presented toward the oncoming fuel and air, and this webbing extends across the slots 16. At one end, the webbing is anchored to the vanes by solder or the like 18 but to anchor these webs at their other ends, the ends of the webs are preferably bent upon themselves at 19 and clinched upon the webs.

The construction shown or a substantial equivalent thereof provides a device which will produce a homogenous mixture of air and sprayed fuel and will prevent clinging of the fuel to the walls of the passage. All of the vanes are preferably constructed as shown and described and mounted upon a ring such as 10, but it is possible that within the scope of the invention, analogous vanes could be mounted in some other manner within the fuel intake passage.

We claim:—

1. A device of the class described comprising an annular member through which sprayed fuel and air may pass, a plurality of helically pitched vanes secured to and projected inwardly from said member, the ends of said vanes toward the direction in which the fuel and air travel being provided with a plurality of longitudinal slits and being curved into substantially trough-shape to receive the air and fuel and allow discharge of a portion thereof through the slits.

2. A device of the class described comprising an annular member through which sprayed fuel and air may pass, a plurality of helically pitched vanes secured to and projecting inwardly from said member, the ends of said vanes toward the direction in which the fuel and air travel being provided with a plurality of longitudinal slits and being curved into substantially trough-shape to receive the air and fuel and allow discharge of a portion thereof through the slits, coverings of finely woven wire upon the inner curved sides of said vanes and extending across said slits, the free ends of said vanes being bent upon said coverings to anchor them, and means securing said coverings to the other ends of said vanes.

3. A device of the class described comprising an annular member through which sprayed fuel and air may pass, a plurality of helically pitched vanes secured to and projecting inwardly from said member, the ends of said vanes toward the direction in which the fuel and air travel being provided with a plurality of longitudinal slits through which some of the fuel and air passes, coverings of finely woven wire on said vanes and extending across said slits, the slitted ends of the vanes being bent and clinched upon said coverings to anchor the latter at one end, and means securing the other ends of said coverings to said vanes.

In testimony whereof we affix our signatures.

HANS BRANDL.
ARTHUR GOLDBERGER.